Figure 2:
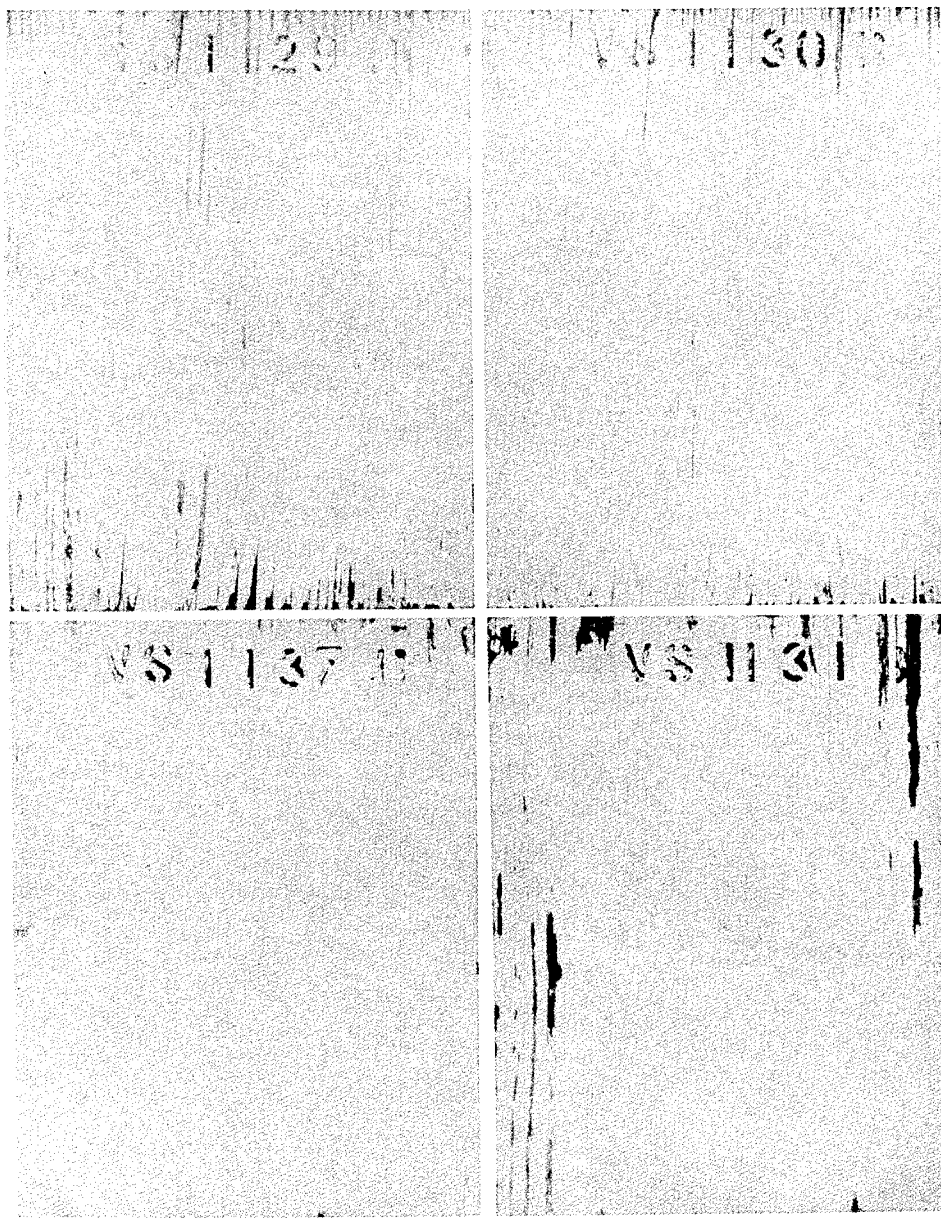

Dec. 1, 1959 E. F. SCHUMACHER ET AL 2,915,411
PAINT COMPOSITIONS
Filed March 8, 1957 3 Sheets-Sheet 1
FIG.I.
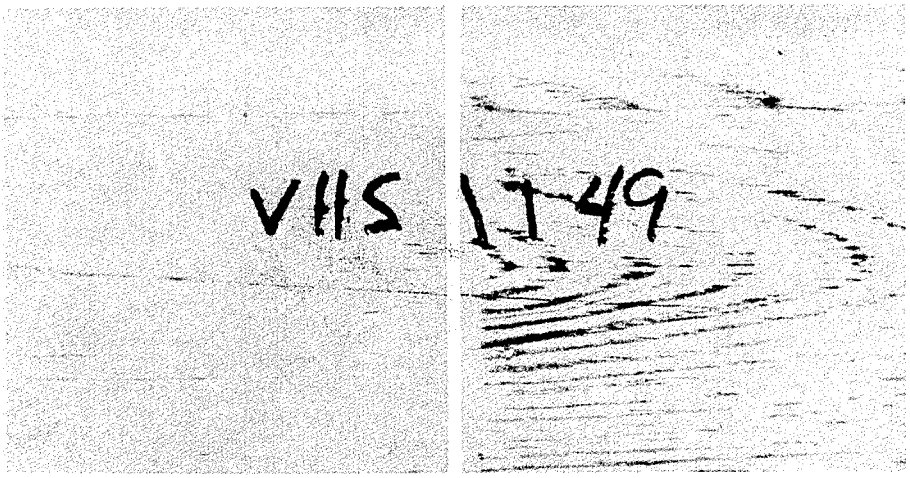
a      b
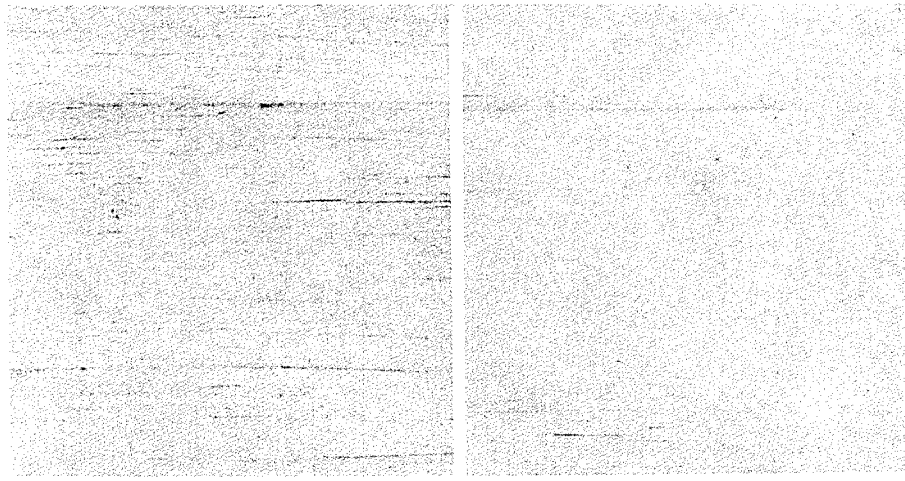
c      d
INVENTOR.
EDWIN F. SCHUMACHER
JAMES N. MOSES
BY
Norman L. Wilson Jr.
Their Attorney

INVENTOR.
EDWIN F. SCHUMACHER
JAMES N. MOSES

FIG.3.
a
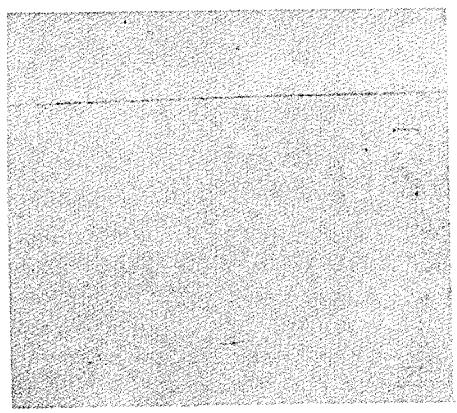
b
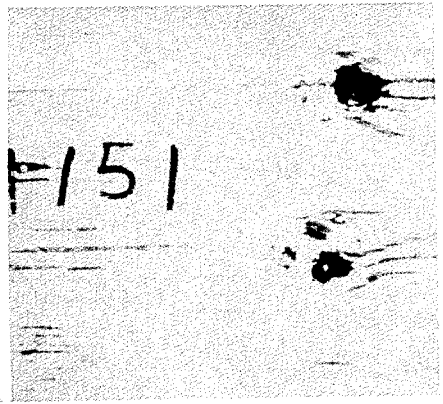
c
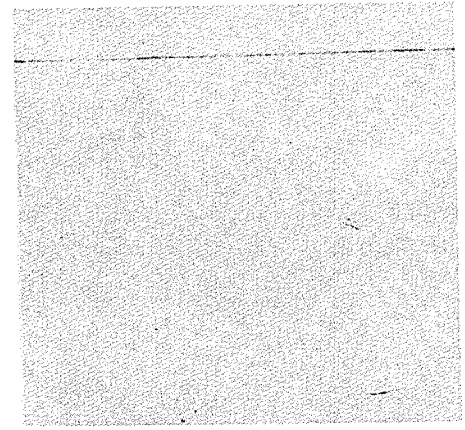
d
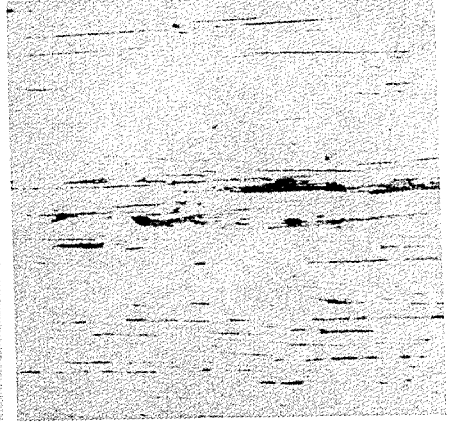

United States Patent Office 2,915,411
Patented Dec. 1, 1959

2,915,411

PAINT COMPOSITIONS

Edwin F. Schumacher and James N. Moses, Louisville, Ky., assignors to Devoe & Raynolds Company, Inc., a corporation of New York Application March 8, 1957, Serial No. 644,776

7 Claims. (Cl. 106—253)

This invention relates generally to pigmented coating compositions. In one of its aspects, the invention pertains to coating compositions for use as exterior paints or primers particularly adapted for poor paint-holding woods. In other of its aspects, the invention relates to a finish coat which is especially suited for use with said primer, thus providing a two coat system.

It is known that the ability of woods to take paint depends upon the inherent characteristics of the wood, woods being classified in five groups with reference to paint-holding properties by the U.S. Department of Agriculture Forest Products Laboratory. Group I, for example, includes woods such as cedars and redwood, on which paints perform well, known as good paint-holding woods. Group IV, on the other hand, includes poor paint-holding woods, such as Southern yellow pine and Douglas fir, beech, birch, the gums, maple of the hardwoods and western larch of the soft woods, as well as flat grain cuts of better paint-holding woods. Group V includes woods of large pores such as ash and oak which require wood filler.

The problem of painting poor paint-holding woods such as group IV woods is patricularly important because Southern yellow pine, a very poor paint-holding wood, is the most widely used wood in the South. Ninety percent of all the exterior siding used in the South is yellow pine, yet Southern yellow pine is one of the most difficult of the common building materials to paint satisfactorily. Southern pine is a generic term which includes a number of species of which the most important are longleaf, shortleaf, loblolly, slash and pond pines. Commercial Southern pine lumber may come from any one of these species or any mixtures of them.

Southern pine is particularly difficult to paint because this wood, when exposed to weather for several weeks, develops small openings or cracks on the surface. These cracks are called wood checks and result from moisture loss. Wood checking can develop as numerous very small slits, or can assume the shape of long, fairly wide wood openings. Freshly cut wood has a high moisture content, the moisture leaving the wood at a rate depending upon surrounding conditions. As the moisture leaves, the wood fiber shrinks, shrinking apparently occurring in all three directions. When shrinkage of wood occurs, the paint film is under a stress or strain causing most films to break, and in time, loss of adhesion develops. When paint scaling occurs, there is generally evidence of wood checks. Another disadvantage of Southern pine is that it expands and contracts more than most other woods as it gains and loses moisture; yet cool and damp weather causes the wood to become wider, thicker and heavier and prolonged hot summer weather causes the wood to lose its moisture content and the wood shrinks abnormally. This means that the paint film is subject to more stress as Southern pine expands and contracts from gain or loss of moisture. For this reason, studies have been carried out for years to develop improved paints or paint systems for Southern yellow pine, the trend being toward two coat paint systems.

Even in connection with two coat paint systems, repaint studies have indicated that the coating next to the wood, or primer, has a profound influence on the performance of paints used over it. If a poor primer is used on the wood originally it is to be expected that paints over it will fare badly. Primers which crack and scale present extremely bad repaint surfaces. It is therefore difficult to overcome the characteristics of a bad foundation.

In one of its embodiments, this invention pertains to an undercoat or primer for poor paint-holding woods and particularly for Southern yellow pine which shows a vast improvement over primers considered to be quite good. The primer of the invention has proved particularly satisfactory on Southern yellow pine exposures on both panels and houses. The films are durable, and have little tendency to crack, to check or to lose distensibility.

Referring first to the pigment, an important compositional aspect of the primer embodying this invention is that it does not include zinc oxide or leaded zinc pigmentations. The pigmentation of the primer embodying this invention does, however, include both titanium dioxide and lead pigments. Rutile titanium dioxide pigments, which are known to produce stronger films than anatase pigments, are preferred. In connection with lead pigments, it has been reported that the use of lead pigments in both small and large quantities is beneficial. The pigmentations of primers embodying this invention contain at least 19 percent basic carbonate white lead; however, the invention contemplates a balancing of other ingredients.

Water ground mica is an extender which deserves special consideration. Like other silicaceous extenders it develops practically no hiding and is accordingly not necessarily used in lieu of magnesium silicate, whiting, gypsum or barytes. However, it is a necessary element of the unusual combination of pigments and vehicle comprising the primer embodying this invention.

While many experimental primers have been formulated and exposed, vehicle studies have not been as extensive. In accordance with this invention it has been found that the beneficial effect of water ground mica is not great by itself, but when mica is used in combination with a vehicle containing pentaerythritol esters of soybean oil acids an unexpected improvement in performance results, yielding a superior primer. In one aspect this invention thus pertains to a paint composition resulting from the combination of a titanium dioxide pigmentation devoid of zinc pigments but containing basic carbonate white lead and at least 7 percent on the pigmentation of mica in a finely divided state at least as finely ground as water ground mica, with a binder containing at least 55 percent pentaerythritol esters of soybean oil acids or acids of similar oils by weight based on the vehicle. By mica "at least as finely ground as water ground mica" is meant mica in a finely divided state such that at least 90 percent of the mica particles have a thickness of not more than 2 microns and a diameter about 10 to 30 times greater than their thickness. By binder is meant the non-volatile portion of the vehicle, excluding driers. Generally speaking paint compositions or primers of this invention contain 7 percent or more water ground mica or the like in a zincless pigmentation which also contains at least 15 percent titanium dioxide, usually a non-chalking grade of rutile titanium dioxide, and at least 19 percent basic carbonate white lead, by weight of the pigmentation, the remainder of the 100 weight percent of the pigmentation being any of the known extenders such as magnesium silicate, silica, barium sulphate, or combinations thereof. In addition, the pigment is at least 50 percent of the total paint by weight. The vehicles of the paint compositions embodying this invention include binders containing at least 55 percent, but usually not more than 75 percent pentaerythritol esters of soybean oil fatty acids as non-volatile matter. The vehicle, if desired, also can contain as non-volatile matter, raw or other low viscosity linseed oils, heat bodied tung, dehydrated castor oil and heat bodied linseed oil. As volatile matter, petroleum, terpene solvents and the like can be used, the pigment volume concentration being in the range of 30 percent to 42 percent. Pentaerythritol esters of soybean oil acids are generally known and are prepared by substantially complete esterification of the soybean oil fatty acids with pentaerythritol. While pentaerythritol esters of soybean oil acids are preferred in all of the compositions embodied in this invention, pentaerythritol esters of acids of equivalent low linolenic acid content oils (containing not more than 6 or 7 percent linolenic acid) can be used, that is vegetable oil acids characterized by having an iodine value in the range of 130 to 150, the linolenic acid content below 7 percent, and no unsaturated acids of over 18 carbon atoms. Examples of such vegetable oil acids are cottonseed types, refrigerated or otherwise treated to remove saturated acid components such as stearic and palmitic. Other such vegetable oil acids from which pentaerythritol esters can be formed, are available commercially, for example, Safflower, Neofat 140, etc., Neofat 140 being distilled cottonseed fatty acids having an iodine value of 140 to 143 and containing 1 percent linolenic acid. In addition, conventional metallic driers can also be used.

Also resins such as ester gum solution containing either the glycerine or pentaerythritol ester of rosin can be used in the primer. In some exposure tests, the incorporation of this resin solution into the primer has added durability to the primer. In some instances, up to 6.5 percent solid ester gum by weight on total binder solids can be used.

The following is illustrative of a preferred primer of the invention, percents being percent by weight:

Pigment—59.1 percent
  Composition:
    25.3 percent non-chalking rutile titanium dioxide
    28.5 percent basic carbonate white lead
    12.7 percent magnesium silicate
    22.7 percent silica ($SiO_2$)
    10.1 percent water ground mica
    .8 percent litharge (PbO)
    ———
    100.1 percent Vehicle—40.9 percent
  Non-volatile binder—59.6 percent
    Composition:
      57.9 percent unbodied pentaerythritol esters of soybean oil acids
      10.5 percent heat bodied tung oil
      15.7 percent heat bodied linseed oil
      15.9 percent raw linseed oil
      ———
      100.0 percent Volatile and drier—40.4 percent
    Composition:
      91.8 percent mineral spirits
      8.2 percent lead and manganese drier solutions
      ———
      100.0 percent As indicated previously for best results on poor paint-holding woods two coat systems are desirable. While the primer described herein can be used with various finishing coats, it has been found that the best finish for use with the primer embodying this invention is a novel paint composition which also depends for its improved properties on the combination of finely divided mica and pentaerythritol esters of soybean oil acids. The special exterior paint embodying this invention is a particularly good house paint finish and provides markedly improved finish coats on poor paint-holding woods when used with any primer. However, in conjunction with the primer embodying the invention results are obtained which are not obtainable with either paint in combination with some other coat.

The exterior finish embodying this invention is similar to the primer described but the pigmentation of the paint finish contains at least 10 percent zinc, preferably acicular or nodular zinc oxide, of the type conventionally used in house paints. While their use is not necessary, basic carbonate white lead or other basic white lead pigments can be used in conjunction with the zinc oxide or leaded zinc can be substituted for the zinc oxide on an equivalent basis.

In addition to zinc oxide, the pigment of the exterior finish coat also contains at least 12 percent titanium dioxide and from 5 to 15 percent water ground mica or mica equally as finely ground. The remainder of the pigment on a 100 percent basis includes known extenders such as silica, magnesium silicate, china clay, barium sulphate, calcium sulphate, and calcium carbonate or combinations thereof, the pigment being not less than 50 percent by weight of the total paint.

The binder of the exterior finish paint contains not less than 65 percent non-volatile matter including at least 20 percent pentaerythritol esters of soybean oil acids. Preferably the finish binder contains from 20 to 100 percent low viscosity pentaerythritol esters of soybean oil acids, but 20 percent low viscosity pentaerythritol esters of soybean oil acids along with bodied pentaerythritol esters of soybean oil acids, tung, or dehydrated castor oil or low viscosity linseed oil, are also contemplated, the pigment volume concentration being 26 to 36 percent. Volatile matter of the binder of the exterior finish is petroleum, terpene or coal tar solvent.

The improved exterior finish paint of this invention is best illustrated by the following formula:

Pigment—55.8 percent
  Composition:
    59.4 percent titanium calcium pigment
    31.1 percent zinc oxide
    8.3 percent water ground mica
    0.8 percent litharge (PbO)
    0.4 percent aluminum stearate
    ———
    100.0 percent Vehicle—44.2 percent
  Non-volatile binder—74.2 percent
    Composition:
      48.9 percent processed linseed oils (low heat bodied)
      30.8 percent unbodied pantaerythritol esters of soybean oil acids
      20.3 percent bodied pentaerythritol esters of soybean oil acids
      ———
      100.0 percent Volatile and dried—25.8 percent
    Composition:
      91.2 percent mineral spirits
      8.8 percent lead and manganese drier solutions
      ———
      100.0 percent To illustrate the markedly improved performance of both the primers and the two coat systems of this invention, results of exposure studies are given. In connection with these exposure studies reference is made to the accompanying photographs in which Figure 1 shows, in four pictures, two paint systems exposed side by side.

Figure 2, in four pictures, is a comparison of four undercoats or primers.

Figure 3, by four pictures, illustrates the superiority of the two coat systems of the invention.

Extensive outdoor weathering tests were made of many paint systems on Southern pine lumber. The accompanying photographs of panels taken from these studies illustrate the excellent performance of the special undercoat and finish coat of this invention used singly or in combination and also specifically show the unusual performance resulting from use of water ground mica in combination with pentaerythritol esters of soybean oil acids in an undercoat.

For clarification the compositions by weight percentages of the various paints on the panels are first given. Undercoats A and C are good conventional primers, while undercoat B is the primer illustrating this invention. Undercoats D, E, and F are modified as will be described.

*Undercoat A*

|  | Percent |
|---|---|
| Pigment | 64.8 |
| Vehicle | 35.2 |

Pigment composition:

| | Percent |
|---|---|
| Anatase titanium dioxide | 11.2 |
| Barium sulphate | 26.1 |
| Basic carbonate white lead | 37.8 |
| Magnesium silicate | 24.9 |
| | 100.0 |

Vehicle composition:

| | Percent |
|---|---|
| Raw linseed oil | 33.8 |
| Bodied linseed and tung oil (60 percent linseed and 40 percent tung) | 20.6 |
| Ester gum | 3.7 |
| Mineral spirits and drier solution | 41.9 |
| | 100.0 |

*Undercoat B*

|  | Percent |
|---|---|
| Pigment | 59.2 |
| Vehicle | 40.8 |

Pigment composition:

| | Percent |
|---|---|
| Non-chalking rutile titanium dioxide | 24.6 |
| Basic carbonate white lead | 29.1 |
| Magnesium silicate | 14.3 |
| Silica (SiO$_2$) | 22.1 |
| Water ground mica | 9.9 |
| | 100.0 |

Vehicle composition:

| | Percent |
|---|---|
| Unbodied pentaerythritol esters of soybean oil acids | 45.2 |
| Bodied linseed and tung oil (60 percent linseed and 40 percent tung) | 15.5 |
| Mineral spirits and drier solution | 39.3 |
| | 100.0 |

*Undercoat C*

|  | Percent |
|---|---|
| Pigment | 59.1 |
| Vehicle | 40.9 |

Pigment composition:

| | Percent |
|---|---|
| Non-chalking rutile titanium dioxide | 24.6 |
| Basic carbonate white lead | 29.1 |
| Magnesium silicate | 24.2 |
| Silica (SiO$_2$) | 22.1 |
| | 100.0 |

Vehicle composition:

| | Percent |
|---|---|
| Raw linseed oil | 45.3 |
| Bodied linseed and tung oil (60 percent linseed and 40 percent tung) | 15.5 |
| Mineral spirits and drier solution | 39.2 |
| | 100.0 |

*Undercoat D*

Same composition as undercoat C except that unbodied pentaerythritol esters of soybean oil acids have been used in place of raw linseed oil.

*Undercoat E*

Same composition as undercoat C except that ten percent water ground mica has been used in the pigment portion replacing an equal amount of magnesium silicate.

*Undercoat F*

|  | Percent |
|---|---|
| Pigment | 57.8 |
| Vehicle | 42.2 |

Pigment composition:

| | Percent |
|---|---|
| Non-chalking rutile titanium dioxide | 26.0 |
| Basic carbonate white lead | 20.7 |
| Magnesium silicate | 29.9 |
| Silica (SiO$_2$) | 23.4 |
| | 100.0 |

Vehicle composition:

| | Percent |
|---|---|
| Unbodied pentaerythritol esters of soybean oil acids | 45.4 |
| Bodied linseed and tung oil (60 percent linseed and 40 percent tung) | 15.5 |
| Mineral spirits and drier solution | 39.1 |
| | 100.0 |

Finish coats are exemplified as follows, finish coats A and C being good conventional coatings while finish coat B embodies the principles of this invention.

*Finish coat A*

|  | Percent |
|---|---|
| Pigment | 63.9 |
| Vehicle | 36.1 |

Pigment composition:

| | Percent |
|---|---|
| Lead titanate | 5.0 |
| Anatase titanium dioxide | 14.0 |
| Cofumed leaded zinc oxide (65 percent zinc oxide and 35 percent basic sulphate white lead) | 44.6 |
| Basic carbonate white lead | 13.4 |
| Magnesium silicate | 23.0 |
| | 100.0 |

Vehicle composition:

| | Percent |
|---|---|
| Raw linseed oil | 88 |
| Mineral spirits and drier solution | 12 |
| | 100 |

*Finish coat B*

|  | Percent |
|---|---|
| Pigment | 59.4 |
| Vehicle | 40.6 |

Pigment composition:

| | Percent |
|---|---|
| Titanium calcium pigment (30 percent rutile titanium dioxide and 70 percent calcium sulphate) | 57.7 |
| Acicular zinc oxide | 31.6 |
| Water ground mica | 10.7 |
| | 100.0 |

Vehicle composition:
  Processed low viscosity linseed oil _____ 13.7
  Unbodied pentaerythritol esters of soybean oil acids _____ 47.5
  Bodied dehydrated castor oil _____ 7.3
  Mineral spirits and drier solution _____ 31.5
                                                                      100.0

Finish coat C

| | Percent |
|---|---|
| Pigment | 61.6 |
| Vehicle | 38.4 |

Pigment composition:
  Titanium calcium pigment (30 percent rutile titanium dioxide and 70 percent calcium sulphate) _____ 53.7
  Acicular zinc oxide _____ 29.4
  Natural calcium carbonate _____ 16.9
                                                                      100.0

Vehicle composition:
  Processed low viscosity linseed oil _____ 47.8
  Raw linseed oil _____ 11.2
  Bodied dehydrated castor oil _____ 11.2
  Mineral spirits and drier solution_____ 29.8
                                                                      100.0

The weathering tests were conducted at Coral Gables, Florida, and in Louisville, Kentucky, area, the panels being exposed in a vertical plane facing south. This is a conventional form of exposure and simulates the type exposure which takes place on the vertical side of a house facing south. All undercoats in the test were applied at a prescribed paint spreading rate of 450 square feet per gallon. All finishes were applied at 550 square feet per gallon. By this procedure the thickness of film on the various panels is approximately the same on all panels.

Pictures a and b of Figure 1 show two paint systems exposed side by side on a conventional piece of No. 105 Novelty Ship-lap Southern Pine Siding. This siding was exposed vertical south in the Louisville, Kentucky, area for seven years. The right side (picture b) of the siding is coated with a two coat system where undercoat A is the primer and finish coat A is the finish. On the left side of the panel (picture a), undercoat B, embodying the invention, is the first coat and conventional finish coat A is the finish. The finish coat is the same but the undercoats are different. Undercoat A and finish coat A represent a paint system which has been proved to be exceptionally good for general durability. The picture clearly shows that undercoat B, embodying this invention, has performed much better than undercoat A when the finish coat is the same, namely finish coat A.

Undercoat B employs pentaerythritol esters of soybean oil acids and water ground mica in combination.

Pictures c and d of Figure 1 show the effect of the improved finish coat embodying this invention. The panels were exposed for seven years at vertical south in the Louisville, Kentucky, area. The panel c (the left side) has as a first coat undercoat F and as a finish coat, finish coat C. The panel D has as the first coat undercoat F and as a finish coat, finish coat B embodying this invention. The undercoat is the same but the finishes vary. Undercoat F is a modified undercoat not embodying the invention. It is clear that finish coat B, embodying this invention, has performed much better than conventional finish coat C over the same undercoat. Finish coat B contains both water ground mica and pentaerythritol esters of soybean oil acids used in combination.

Figure 1 thus amply demonstrates that the composition of the undercoat is a significant factor in the performance of the system. It also shows that the composition of the finish coat is a significant factor in performance.

Figure 2: The Southern pine panels in Figure 2 were exposed for two years in Coral Gables, Florida, and were then exposed for two additional years in the Louisville, Kentucky, area for a total of four years exposure at vertical south. Figure 2 illustrates the effect of using pentaerythritol esters of soybean oil acids and water ground mica alone and in combination in undercoats. Panel a has as first coat undercoat C. This is a linseed oil undercoat using no mica. Panel b has as first coat undercoat D. This undercoat differs from C in that unbodied pentaerythritol esters of soybean oil acids has replaced all the linseed oil. Panel d has as first coat undercoat E. Here water ground mica has been used in lieu of a portion of magnesium silicate in undercoat C. Panel c has as first coat undercoat B where pentaerythritol esters of soybean oil acids and water ground mica are used in combination according to the invention. On all panels the same finish coat has been used, namely finish coat C. It is apparent that while undercoats D and E do not offer apparent improvements, undercoat B is outstanding. The conclusion to be drawn is that the performance of pentaerythritol esters of soybean oil acids and water ground mica used in combination is markedly superior to that anticipated from the performance of these constituents studied singly.

Having shown the beneficial effect of pentaerythritol esters of soybean oil acids and water ground mica used in combination in both the undercoat and the finish coat the result of using these superior products in combination is now shown in Figure 3.

Picture a shows painted Southern pine siding after seven years' exposure at vertical south in the Louisville, Kentucky, area. On side b undercoat A and finish coat A, both conventional coatings, have been used. On the left side, undercoat B and finish coat B, both embodying the invention, have been used. The superiority of the latter two coat system on the same siding is outstanding. Pictures c and d show close-up sections of the films represented by the two systems a and b respectively. The system shown in picture c and using undercoat B and finish coat B according to the invention is in excellent condition after seven years vertical south exposure. It is thus evident that the unusual undercoat and finish coat used in combination results in an outstanding two coat system for Southern pine.

The primers and finish coats embodying this invention have been described in connection with ingredients most generally employed in paint compositions. It is understood, however, that other modifications and variations will occur to those skilled in the art of paint formulation. Thus, various known mildew inhibiting compounds can be incorporated into these paint compositions if desired. In addition, whereas combinations of bodied and unbodied oils are generally used as binder components, medium bodied oils can also be used.

It will be understood that such modifications and variations are deemed to be within the scope of this invention. It will be understood also that pigment and vehicle components embodied in this invention, such as titanium dioxide, basic carbonate white lead, finely ground mica, silicate and sulphate extenders, as well as bodied tung, castor and linseed and unbodied pentaerythritol esters of soybean oil acids are all well known and need not be discussed at length. However, no resin solution is used in these undercoats. Unbodied oils when used have low viscosities in the range of A–G, Gardner-Holdt. Bodied pentaerythritol esters of soybean oil acids can be used in the compositions of this invention with other unbodied drying oils but they are not as desirable.

What is claimed is:

1. A paint composition comprising a titanium dioxide pigmentation containing at least 12 percent titanium dioxide based on the total pigments and at least 5 percent mica in a finely divided state such that at least 90 percent of the mica particles have a thickness of not more than 2 microns and a diameter about 10 to 30 times greater than their thickness, in combination with a binder containing at least 20 percent by weight based on the binder of substantially completely esterified pentaerythritol esters of vegetable oil acids, the vegetable oil acids characterized by having a linolenic acid content below 7 percent, an iodine value of 130 to 150, and no unsaturated acids of over 18 carbon atoms, the ratio of total paint weight to the weight of the binder being at least 2 to 1.

2. A primer for poor paint-holding woods comprising a titanium dioxide pigmentation devoid of zinc but containing basic carbonate white lead and at least 7 percent on the total pigment of mica in a finely divided state such that at least 90 percent of the mica particles have a thickness of not more than 2 microns and a diameter about 10 to 30 times greater than their thickness, in combination with a binder containing at least 55 percent of substantially completely esterified pentaerythritol esters of soybean oil acids by weight based on the binder, the ratio of the total paint weight to the weight of binder being at least 3 to 1.

3. A primer for poor paint-holding woods comprising a zincless pigmentation containing at least 15 percent rutile titanium dioxide by weight of the total pigment, at least 19 percent basic carbonate white lead and at least 7 percent mica in a finely divided state such that at least 90 percent of the mica particles have a thickness of not more than 2 microns and a diameter about 10 to 30 times greater than their thickness, in combination with a binder containing as its principal oil at least 55 percent of substantially completely esterified pentaerythritol esters of soybean oil acids by weight based on the binder, the ratio of total paint weight to the weight of the binder being in the range of 3 to 1 to 5 to 1.

4. A primer for poor paint-holding woods comprising a zincless pigmentation containing at least 15 percent rutile titanium dioxide by weight based on the total pigment, at least 19 percent basic carbonate white lead, at least 7 percent mica in a finely divided state such that at least 90 percent of the mica particles have a thickness of not more than 2 microns and a diameter about 10 to 30 times greater than their thickness, and not more than 59 percent of an extender in combination with a binder including at least 55 percent of unbodied substantially completely esterified pentaerythritol esters of soybean oil acids and at least 10 percent of a bodied drying oil ester, all by weight based on the binder, the ratio of total paint weight to the weight of the binder being in the range of 3 to 1 to 5 to 1.

5. A primer for poor paint-holding woods comprising a zincless pigmentation containing from 15 to 30 percent rutile titanium dioxide by weight based on the total pigment, from 19 to 35 percent basic carbonate white lead, from 7 to 15 percent on the total pigment of mica in a finely divided state such that at least 90 percent of the mica particles have a thickness of not more than 2 microns and a diameter about 10 to 30 times greater than their thickness, and from 30 to 59 percent of an extender based on the total pigment in combination with a vehicle including from 55 to 75 percent of unbodied substantially completely esterified pentaerythritol esters of soybean oil acids, from 10 to 40 percent of a heavy bodied drying oil, and from 10 to 45 percent volatile solvent all based on the weight of the binder, the ratio of total paint weight to the weight of the binder being in the range of 3 to 1 to 5 to 1.

6. An exterior paint for use as an outside coat over a primer, which comprises a pigmentation containing at least 12 percent titanium dioxide and at least 5 percent mica in a finely divided state such that at least 90 percent of the mica particles have a thickness of not more than 2 microns and a diameter about 10 to 30 times greater than their thickness, in combination with a binder containing at least 20 percent of substantially completely esterified pentaerythritol esters of soybean oil acids by weight on the binder, the ratio of total paint weight to the weight of the binder being in the range of at least 2 to 1.

7. An exterior paint for use as an outside coat over a primer, which comprises a pigmentation containing at least 10 percent titanium dioxide by weight on the total pigment, at least 12 percent on the pigment of zinc oxide, at least 5 percent on the total pigment of mica in a finely divided state such that at least 90 percent of the mica particles have a thickness of not more than 2 microns and a diameter about 10 to 30 times greater than their thickness, and sufficient extender by percent to bring the pigment to 100 percent, in combination with a binder including at least 20 percent of unbodied substantially completely esterified pentaerythritol esters of soybean oil acids, the ratio of total paint weight to the weight of the binder being in the range of 2 to 1 to 4 to 1.

References Cited in the file of this patent

UNITED STATES PATENTS

| | | |
|---|---|---|
| 1,175,110 | Arnold | Mar. 14, 1916 |
| 1,396,986 | Berg | Nov. 15, 1921 |
| 1,408,091 | Kellam | Feb. 28, 1922 |
| 1,689,567 | Turner | Oct. 30, 1928 |
| 2,239,126 | Swenarton | Apr. 22, 1941 |
| 2,246,452 | McGrew | June 17, 1941 |
| 2,550,703 | Lewis | May 1, 1951 |
| 2,568,424 | Watson | Sept. 18, 1951 |

FOREIGN PATENTS

| | | |
|---|---|---|
| 153,884 | Great Britain | May 12, 1921 |
| 528,526 | Great Britain | Oct. 31, 1940 |